Figure 1:
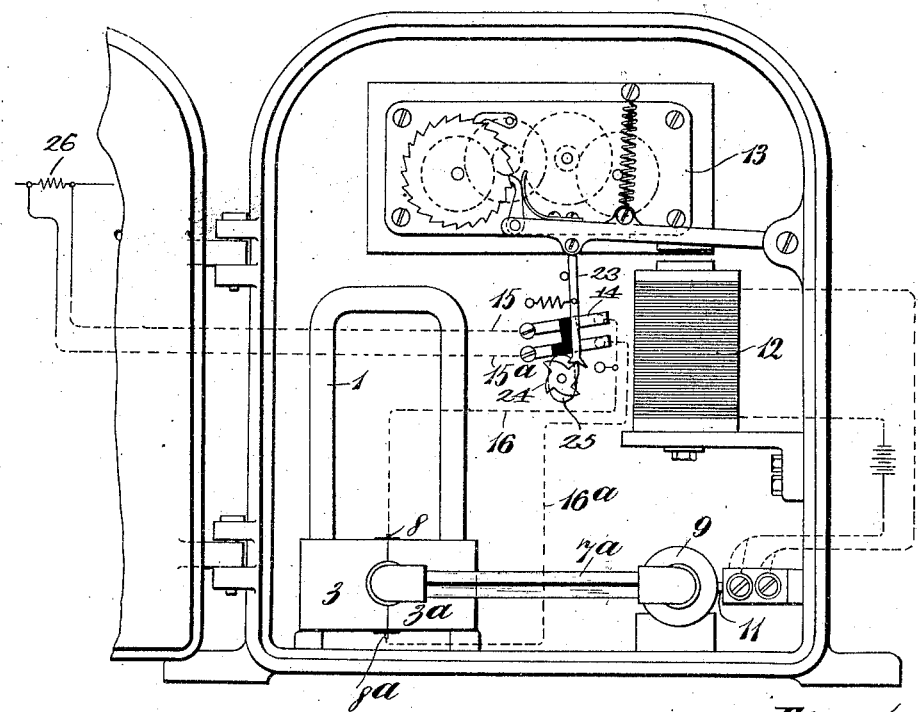

No. 853,789. PATENTED MAY 14, 1907.
F. HOLDEN.
MERCURY METER.
APPLICATION FILED JAN. 24, 1906.

3 SHEETS—SHEET 1.

Witnesses:
Benjamin B. Hull
Helen Alford

Inventor:
Frank Holden.
by Albert G. Davis
Att'y

No. 853,789. PATENTED MAY 14, 1907.
F. HOLDEN.
MERCURY METER.
APPLICATION FILED JAN. 24, 1906.

3 SHEETS—SHEET 2.

Witnesses:
Benjamin K. Hull
Helen Oxford

Inventor:
Frank Holden
by Albert H. Davis
Atty

No. 853,789.　　　　　　　　　　　　　　　　　　PATENTED MAY 14, 1907.
F. HOLDEN.
MERCURY METER.
APPLICATION FILED JAN. 24, 1906.

3 SHEETS—SHEET 3.

Witnesses:
Lloyd C. Bush
J. Ellis Glen

Inventor:
Frank Holden,
By Albert G. Davis
Atty

UNITED STATES PATENT OFFICE.

FRANK HOLDEN, OF LONDON, ENGLAND, ASSIGNOR TO GENERAL ELECTRIC COMPANY, A CORPORATION OF NEW YORK.

MERCURY-METER.

No. 853,789.　　　Specification of Letters Patent.　　　Patented May 14, 1907.

Application filed January 24, 1906. Serial No. 297,600.

*To all whom it may concern:*

Be it known that I, FRANK HOLDEN, a citizen of the United States, residing at 1 Harcourt Buildings, Temple, London, England, have invented certain new and useful Improvements in Mercury-Meters, of which the following is a specification.

The object of my invention is to provide a simple form of electric meter suitable for use on either continuous or alternating-current electric circuits.

My invention is based upon the fact that when a liquid conductor carrying an electric current is placed in a magnetic field, a continuous displacement of the liquid is caused which may be used as a measure of the electrical condition of the circuit on which the conductor is connected. In the employment of a device of this kind as a watt-hour or ampere hour meter in which means is provided for registering the total displacement of liquid in a given time, it is necessary in order to obtain accurate indications that the movement of the liquid shall be retarded in direct proportion to the rate at which the flow takes place.

I have discovered that by including in the channel, through which the liquid circulates, a tube of capillary dimensions and suitable length, a retardation proportional to the rate of flow of the liquid may be obtained, and that by means of this construction an accurate registration of ampere or watt-hours may be obtained.

My invention, accordingly, consists in providing a meter of the type described with a channel comprising a capillary tube properly dimensioned for furnishing the desired retardation.

When the apparatus is to be used as an ampere-hour meter a constant magnetic field is employed such as would be obtained from a permanent magnet, and when a watt-hour meter is desired a field magnet is provided the strength of which varies in proportion to the voltage variation of the circuit on which the apparatus is connected.

My invention also deals with improved devices for registering the amount of flow of liquid which has taken place in a given time.

In carrying my invention into effect according to one modification I provide a magnet having a pair of pole-pieces which are embedded in a block of insulating material and are separated from each other by a narrow air gap. This air gap forms part of a channel which may be of flat rectangular section this channel being cut in the insulating block, and extending beyond the pole-pieces for a short distance on either side thereof. The channel is filled with mercury or other suitable liquid conductor and opens at its extremities into two cavities formed in the insulating block and also filled with mercury. Extending into these reservoirs is a pair of capillary tubes which are connected together by a tubular channel containing a movable piston. The parts of this channel and the tubes connected therewith on opposite sides of the piston are also filled with mercury. Electrical conductors are provided which make contact with the mercury on a line at right angles to the axis of flow of the mercury in the channel and situated in the field between the magnet pole-pieces. By means of these conductors the mercury may be connected in an electric circuit so as to carry the whole or a portion of the current flowing therein. Instead of forming the mercury channel in a solid block as above described, a pair of flat rectangular blocks of insulating material or of non-magnetic metal having insulated surfaces may be provided. These blocks are superimposed one on the other with an intervening layer of insulating material such as mica which is separated along a line parallel to one of the edges of the blocks so as to form the mercury channel. The blocks at each end of this channel are bored out to form the mercury reservoir cavities and to receive the extremities of the capillary tubes.

The magnet pole-pieces extend into the blocks and terminate opposite one another at the opposed inner surfaces of the blocks so as to give a magnetic field across the channel. These pole-pieces may be pointed and placed very close to each other thus producing a concentrated field of great intensity. The mica layer is also divided at right angles to the channel thus forming a space between the blocks which fills with mercury by means of which the current is taken through the channel between fixed terminal conductors led through one of the blocks.

Where the apparatus is to be used as an ampere-hour meter the magnetic field is furnished by a permanent magnet or equivalent magnet producing a constant magnetic field. In the case however where it is used as a watt-hour meter an electromagnet is employed which is excited by means of a potential winding connected across the supply circuit, the magnet iron being worked below saturation.

The form of instrument just described is arranged so that the current does not flow continuously through the conductor in the same direction. The leading-in conductors are therefore connected to the terminals of a reversing switch adapted to be actuated by movement of the piston above mentioned, so that the current in the mercury is continually being reversed so long as the meter is in operation.

If we assume current flowing through the channel in one direction a difference of pressure will be produced between the two sides of the piston by the inter-action of the magnetic field and the current, causing the piston to move in one direction. The piston in its movement actuates the reversing switch so as to cause the current in the mercury channel to reverse in direction. A difference of pressure is then developed in the opposite direction, causing the piston to return to its initial position, when the switch is again actuated and the movements just referred to are repeated continuously so long as the instrument is in operation.

In order to register the number of reversals and therefore the time integral of the mercury flow, the piston may operate an ordinary meter train of wheels mechanically or its movement may be utilized for the purpose of operating a relay switch controlling the circuit of an electrically operated recording mechanism.

According to a modification of the arrangement just described, in which the flow of current in the liquid conductor is continuously in the same direction, the free ends of the capillary tubes are connected to a reversing valve which communicates with opposite sides of a movable piston situated in a closed cylinder filled with mercury. The valve is arranged to be actuated by the piston. Assuming that the meter is in operation with the valve placed so as to establish communication between one side of the piston and the capillary tube connected to the outlet of the mercury channel and between the opposite side of the piston and the capillary tube connected to the inlet of the mercury channel the mercury flow will cause movement of the piston in one direction. The piston toward the end of its travel actuates the reversing valve so as to reverse the connections between the outlet and inlet capillary tubes and the communicating passages between the valve and the cylinder. The direction of travel of the piston then reverses and when the latter returns to its initial position the valve is again actuated so as to reverse the movement. The piston therefore assumes a reciprocating movement with a unidirectional mercury flow so long as the meter is in operation. The movements of the piston are registered as in the example first described.

It will be obvious that other means than those above described may be adopted for registering the total flow of mercury. For example the inlet to the mercury channel situated in the magnetic field may be supplied from a constant level reservoir and the amount of mercury which flows through the capillary outlet tube may be collected in a graduated vessel or other well known means may be provided for estimating the total flow which has taken place in a given time.

Figure 2:
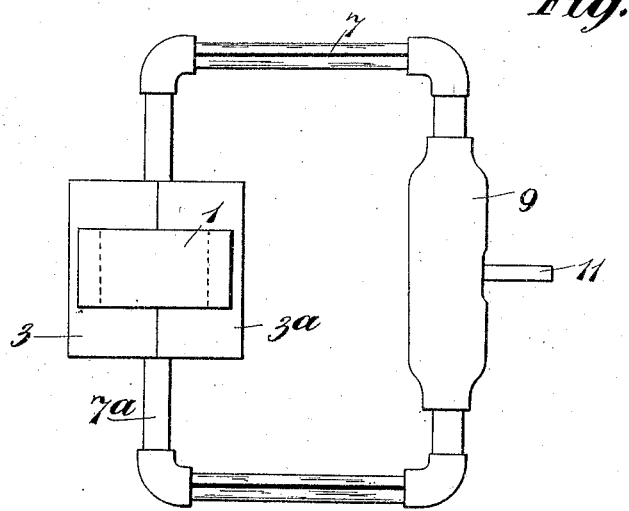
Figure 3:
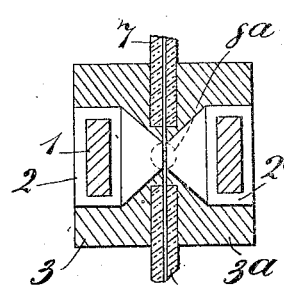
Figure 4:
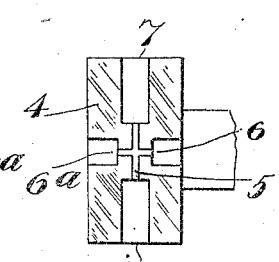
Figure 5:
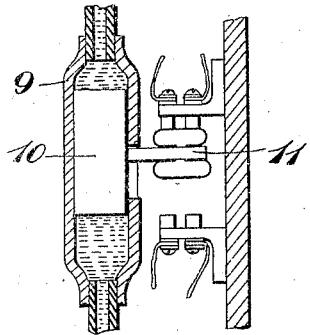
Figure 6:
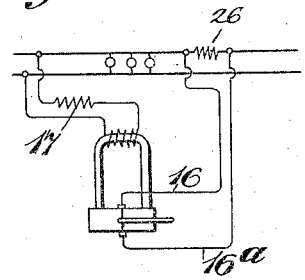
Figures 7, 8:
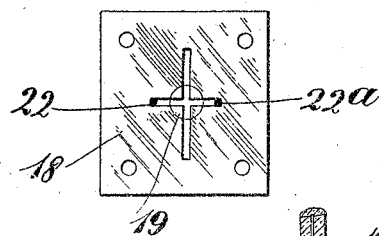
Figure 9:
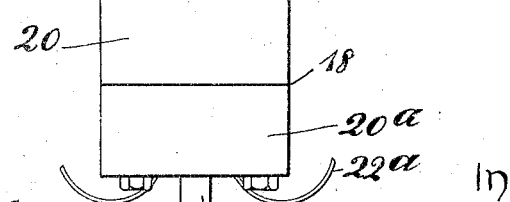
Figure 10:
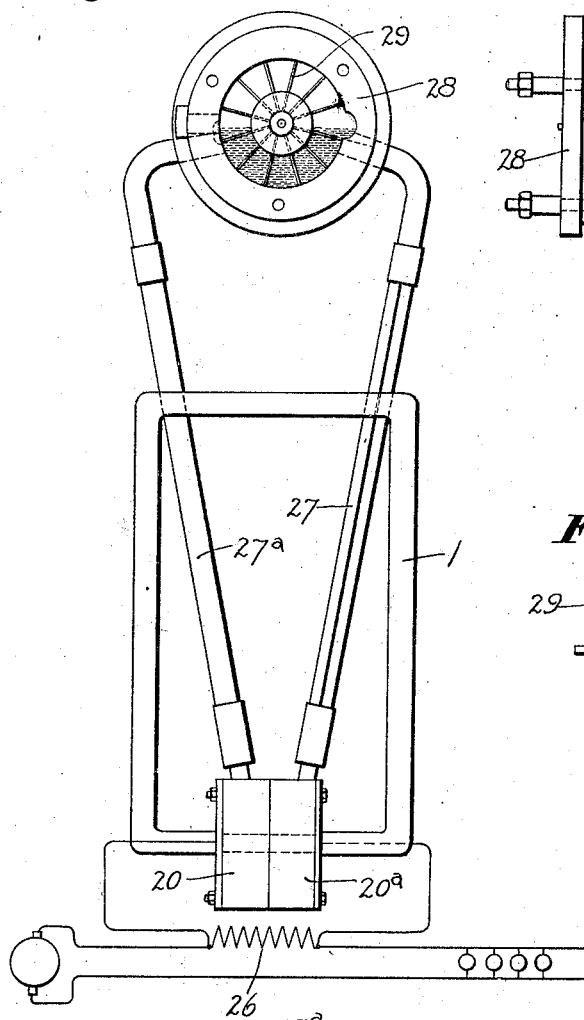
Figure 11:
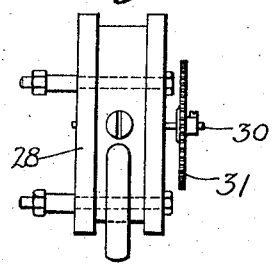
Figure 12:
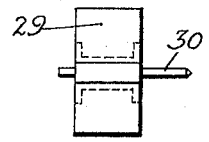
Figure 13:
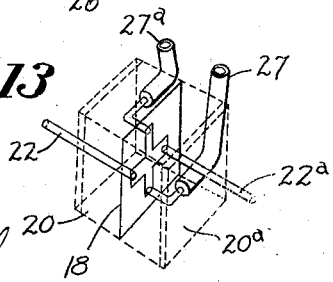

In the accompanying drawings which illustrate my invention, Figure 1 is a side elevation of a mercury meter embodying my improvements; Fig. 2 is a plan of the meter motor and mercury channel; Fig. 3 is a sectional view of the meter motor; Fig. 4 is a face view of one of the blocks forming the mercury chamber; Fig. 5 is a sectional view of the reversing switch; Fig. 6 is a diagram of a form of instrument employing an electromagnetic field; Figs. 7, 8 and 9 are views of a modified construction of meter motor; Fig. 10 shows a meter with a modified form of registering device; and Figs. 11, 12 and 13 show details of the same.

1 represents a permanent magnet provided with pole-pieces 2, $2^a$ (see Fig. 3) of soft iron. These pole-pieces are embedded in blocks 3, $3^a$ of insulating material such as slate or of non-magnetic material unaffected by mercury. The polar extremities are flush with the surfaces of the blocks. The blocks are clamped together with an intervening layer of insulating sheet 4 of mica or other suitable material which is cut, as shown in Fig. 4 so as to form the channel 5 through which the mercury flows and the connections 6, $6^a$ for conveying the electric current across the mercury. The thickness of the mica-sheet is such as to leave an interpolar gap of about .01 cm., in a meter whose maximum capacity is 5 amperes; and the mercury channel is so constructed that the current through the mercury is wholly confined within the field of the magnet. The blocks are drilled so as to form sockets for tubes 7, $7^a$ wholly or partially of capillary bore communicating with the channel 5, and into the holes drilled in the blocks on an axis at right angles to that of the tubes, are sealed conducting plugs 8, $8^a$ which make electrical contact with the mercury in the connections 6, $6^a$.

The tubes connect at their free extremities with a chamber 9 containing a movable plunger 10 (Fig. 5). This plunger may be of glass, iron or other suitable material not affected by mercury, having a sufficiently free fit within the chamber not to allow leakage of mercury between it and the wall of the chamber 9. The channel 5, the tubes 7, 7$^a$ and the chamber 9 on either side of the plunger are completely filled with mercury. The plunger carries a pin 11 projecting through the slot in the wall of the chamber 9 which pin is adapted to bridge two contacts at either extreme of its movement and thereby close the circuit of the registering magnet 12. The armature of this magnet carries a pawl which is drawn forward over a ratchet-wheel and on its retreat actuates the register 13. On the forward movement of the armature a reversing switch 14 changes the connections of the leads 15, 15$^a$ connecting the meter to the consumption circuit. Any suitable and well known connection between the magnet armature and the switch may be employed for this purpose. One such connection is illustrated, comprising the pawl 23, the ratchet 24, and the cam 25, but the particular form of this connection is no part of my invention, and any other well known arrangement may be employed. Thus it will be seen that when the circuit is closed on the leads 16, 16$^a$ of the meter, current passes by plugs 8 and 8$^a$ through the mercury in the channel 5 between the magnet poles, and the mercury is displaced out of the field, the motor acting in fact like a pump, the pressure of which is proportional to the intensity of current passing. So long as the circuit is closed on the terminals 16, 16$^a$, a continuous flow of mercury will be maintained in one direction through the channel 5 and connecting tubes 7, 7$^a$, causing the plunger 10 to move in the direction of flow. As this flow is retarded by the capillary section of the tubes, if the tubes are properly dimensioned as to diameter and length the rate of flow will be proportional to the current, the flow of liquid in a capillary tube being proportional within certain limits, depending on the length and diameter of the tube, to the difference of pressure producing the flow. The length and diameter of the capillary tube necessary for obtaining accurate measurement are dependent on the capacity of the instrument and can be readily determined experimentally for any particular design in a manner which will be obvious to those skilled in the art.

When the plunger 10 reaches the end of its travel in one direction, the reversing switch 14 is actuated causing the direction of mercury flow to be reversed, the number of reversals or the total flow in units of current being indicated on the dials of the meter register. Thus with an instrument of the kind just described we are provided with an ampere-hour meter, since the register will integrate the instantaneous values of the current flowing through the mercury at different consecutive instants of time.

Obviously the instrument may be converted into a watt-meter by varying the field-strength in accordance with the potential of the circuit. The instrument shown in the diagram, Fig. 6, is of this kind. A winding is provided for the iron core which constitutes the field-magnet, instead of the permanent magnet depicted in Fig. 1. The number of turns on the iron core is calculated with a view to exciting the magnet to a point below saturation for the maximum potential of the system, a resistance as indicated at 17 being interposed to cut down the current. Obviously the field might be created without the assistance of iron by placing the field coils close to the mercury chamber. This, however, will be far less sensitive than the arrangement already described. Where small currents are to be integrated the current leads to the mercury chamber may be in series with the load. I prefer, however, to mount them in shunt to a resistance 26 in one of the mains of the load circuit, as indicated in Figs. 1 and 6.

In Figs. 7, 8 and 9 is shown a modification in which the two blocks which form the mercury motor are separated by a sheet of mica 18 in which the mercury space is formed by cutting in it a cruciform opening, the central portion of which is located wholly within the field of a pair of pole-pieces 19, 19$^a$ sealed into the rectangular blocks of slate 20, 20$^a$. The two ends of one limb of the opening communicate through openings in the block with the tubes 21, 21$^a$ through which the mercury flow takes place, while the mercury at the ends of the other limb makes contact with the leading-in conductors 22, 22$^a$ for conveying the current through the mercury.

Instead of employing a reversing switch, as in Fig. 5, and the electro-magnetic register indicated, I may use the arrangement illustrated in Figs. 10 to 13, in which there is interposed in the circulating system a simple paddle-wheel 29 revolving in a closed cylindrical box 28. The paddle-wheel may be provided with a number of rectangular vanes projecting radially from a central spindle 30 all mounted mercury-tight within the box. The clearance between the vanes and the box should be slight so as to prevent leakage from one side to the other except by moving the vanes. The mercury fills the space between the vanes of half the wheel and is fed in at one side of the cylindrical portion of the box and leaves from the other side. As the mercury does not wet the material of the box, which may be of glass, iron or other material not wet by mercury, there is no tendency for the mercury to leak from the inlet to the outlet between the vanes and the box so that the vanes need only have a capillary fit within the box. A register of this kind will not require a reversing switch, since the mercury, so long as it is maintained in movement, can flow in a continuous direction and keep the vanes in motion. For operating the registering train, the spindle 30 may project through the box and be provided with a gear 31 engaging with the registering train. Since the mercury flow is always in one direction, only one of the tubes leading from the meter to the paddle-wheel need be capillary. In Fig. 10 the tube 27 is shown as capillary, while the tube 27ª is not so shown. The arrangement of the mercury chamber shown in Fig. 13 is substantially the same as that shown in Figs. 7, 8 and 9, and corresponding parts are similarly numbered, so that this figure requires no further description. To simplify this figure, the field-poles are omitted.

What I claim as new, and desire to secure by Letters Patent of the United States is:—

1. A mercury meter comprising a motor responsive to current, a circulating liquid, means for periodically reversing the flow of said liquid, and a register operated thereby.

2. A mercury meter comprising a motor varying in power with the applied current, a circulating stream of liquid delivered from and received by the motor, and a closed channel for the liquid comprising a capillary tube dimensioned to offer a retardation to the flow of the liquid proportional to the rate of flow.

3. An electric meter comprising a stream of liquid, an electric pump varying in power according to the load current, and a capillary tube through which the stream must pass dimensioned to offer a retardation to the flow of the liquid proportional to the rate of flow.

4. A mercury meter comprising a mercury chamber inclosed by a magnetic field, current leads from the consumption circuit to said chamber, a duct leading to and from the chamber comprising a capillary tube dimensioned to offer a retardation to the flow of the liquid proportional to the rate of flow, and an integrating recorder measuring the mercury flow.

5. A mercury meter comprising a magnetic field, a narrow mercury chamber within said field, current leads from the consumption circuit to said chamber, and a closed channel for leading the mercury to and from said chamber comprising a capillary tube dimensioned to offer a retardation to the flow of the liquid proportional to the rate of flow.

6. An electric meter comprising a chamber for a conducting liquid inclosed in a magnetic field, current leads to and from the liquid, a circulating system for delivering liquid to and from the chamber free from hydrostatic head, said system having a capillary tube at some point through which the stream must pass dimensioned to offer a retardation to the flow of the liquid proportional to the rate of flow, and a register for the amount of liquid passing in a definite time.

7. An electric meter comprising blocks of insulating material, a layer of incompressible insulating material between said blocks having a channel formed therein, a magnet having its poles extending into said blocks close to said channel, current-leads extending to said channel through said blocks, and a closed liquid duct having its ends opening into said channel.

8. An electric meter comprising blocks of insulating material, a layer of incompressible insulating material between said blocks having a channel formed therein, a magnet having its poles extending into said blocks close to said channel, current-leads extending to said channel through said blocks, and a closed liquid duct having its ends opening into said channel and comprising a capillary tube dimensioned to offer a retardation to a liquid flow proportional to the rate of flow.

9. A mercury meter comprising a narrow mercury chamber inclosed by a magnetic field, current leads to and from the mercury, a duct for leading the mercury to and from the chamber, a register, and a reversing switch actuated by reversal of mercury flow operating said register.

In witness whereof I have hereunto set my hand this 10 day of January, 1906.

FRANK HOLDEN.

Witnesses:
F. J. SKOYLES,
H. D. JAMESON.